(12) United States Patent
Chen

(10) Patent No.: US 8,243,379 B2
(45) Date of Patent: Aug. 14, 2012

(54) CAMERA MODULE

(75) Inventor: Yen-Chun Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 170 days.

(21) Appl. No.: 12/871,931

(22) Filed: Aug. 31, 2010

(65) Prior Publication Data

US 2011/0176231 A1    Jul. 21, 2011

(30) Foreign Application Priority Data

Jan. 21, 2010    (TW) ................................ 99101575 A

(51) Int. Cl.
     *G02B 7/02*      (2006.01)
     *G02B 15/14*      (2006.01)
(52) U.S. Cl. ........................................ 359/825; 359/704
(58) Field of Classification Search .......... 359/694–704, 359/811–830; 396/133
See application file for complete search history.

(56) References Cited

U.S. PATENT DOCUMENTS

| 6,792,204 B2 * | 9/2004 | Suh ................................. 396/90 |
| 7,636,203 B2 * | 12/2009 | Nishimoto ..................... 359/699 |
| 2009/0303325 A1 * | 12/2009 | Mizuno ......................... 348/143 |

* cited by examiner

Primary Examiner — Mohammed Hasan
(74) Attorney, Agent, or Firm — Altis Law Group, Inc.

(57) ABSTRACT

A camera module includes a barrel, a holder, a focus ring and an elastic element. The barrel includes a bottom surface opposing the holder. The holder includes an end surface facing the bottom surface of the barrel. At least one of the bottom surface and the end surface defines a first curved cutout and a second curved cutout. The depth of the first curved cutout is different from that of the second curved cutout. The focus ring is positioned between the bottom surface and the end surface. The focus ring includes a bump. An end of the elastic element is fixed to the barrel and the other end is fixed to the holder. The elastic element pulls the barrel to position the focus ring between the barrel and the holder. When rotating the focus ring, the bump can be received in the first curved cutout or the second curved cutout.

13 Claims, 6 Drawing Sheets

CAMERA MODULE

BACKGROUND

1. Technical Field

The present disclosure relates to a camera module with a multiple-step focus function.

2. Description of Related Art

Currently, a typical camera module includes an induction coil and a magnetic element, which cooperate to move the lens of the camera module to bring the camera module into focus. Thus, the camera module needs to have a receiving space for receiving the induction coil and the magnetic element, thereby increasing the size of the camera module.

Therefore, it is desirable to provide a camera module that can overcome the above-mentioned limitations.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
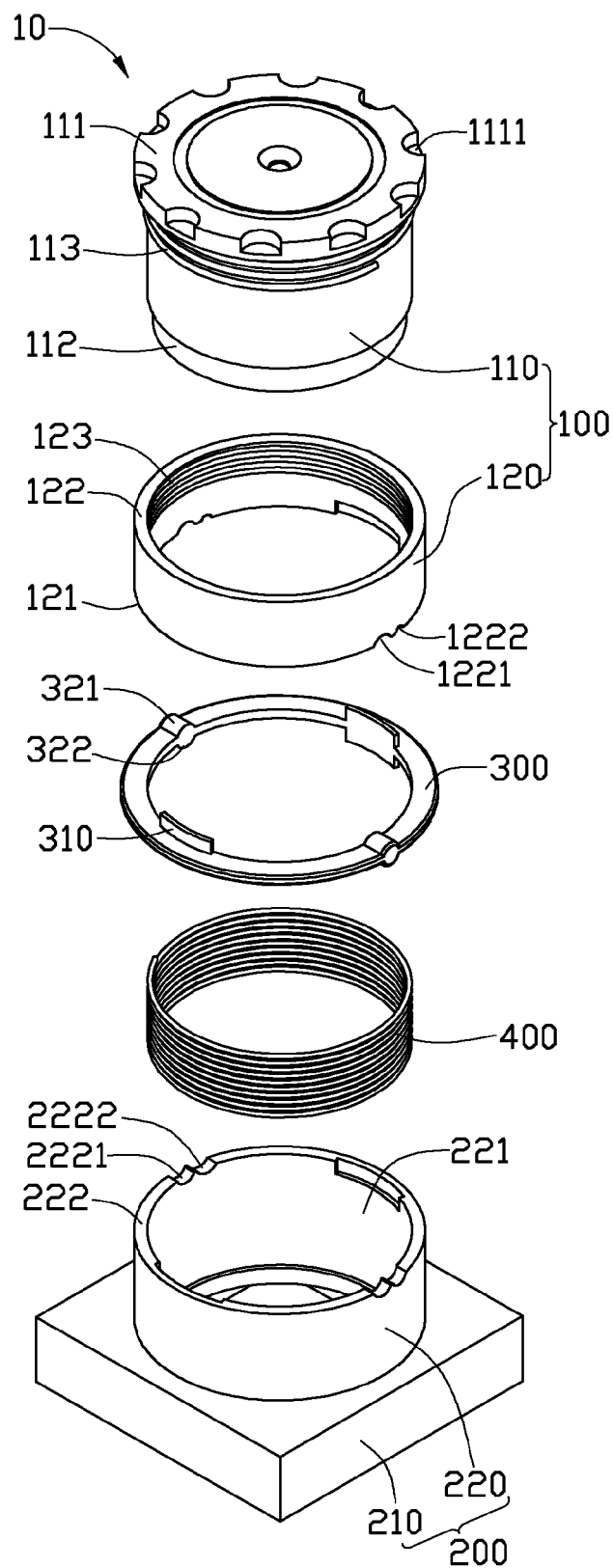
FIG. 1 is an isometric, exploded view of a camera module, according to a first embodiment.
Figure 2:
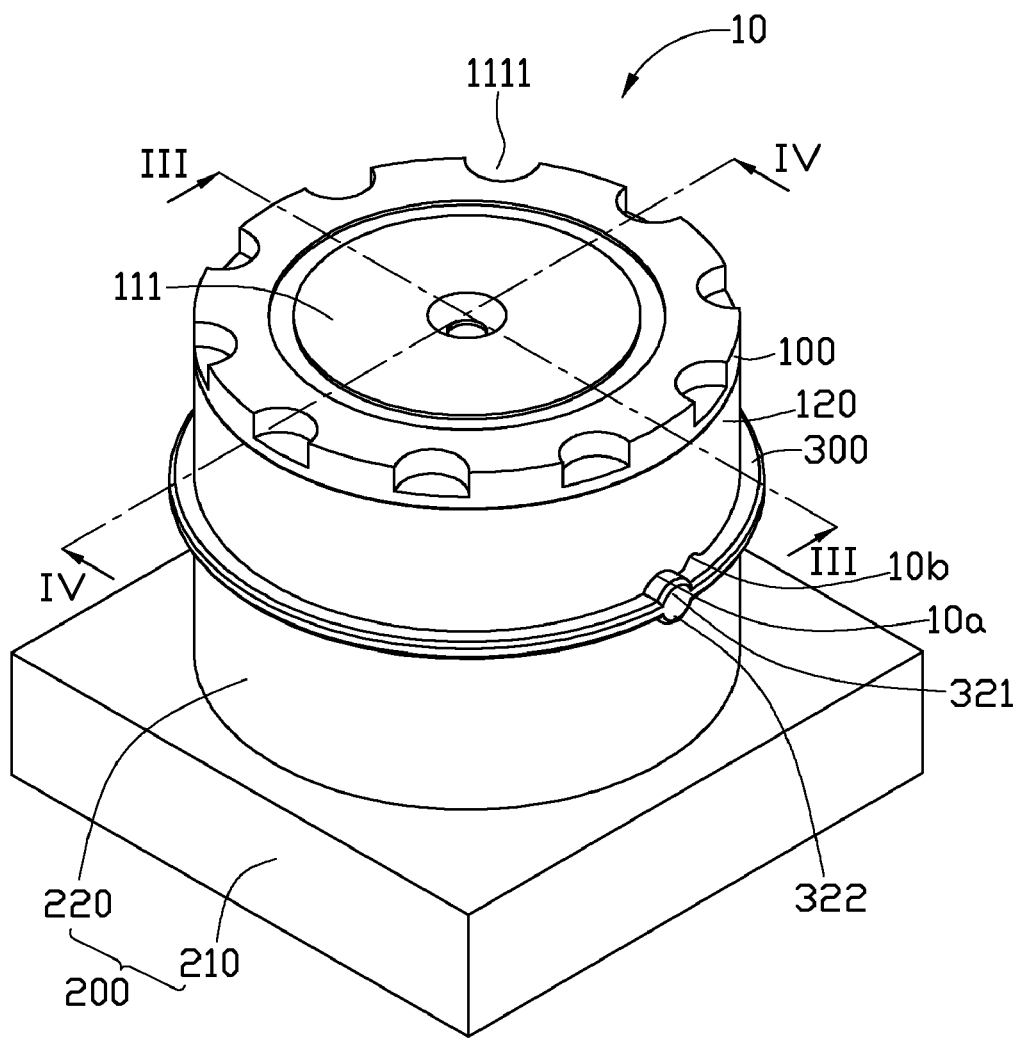
FIG. 2 is an isometric, assembled view of the camera module of FIG. 1.
Figure 3:
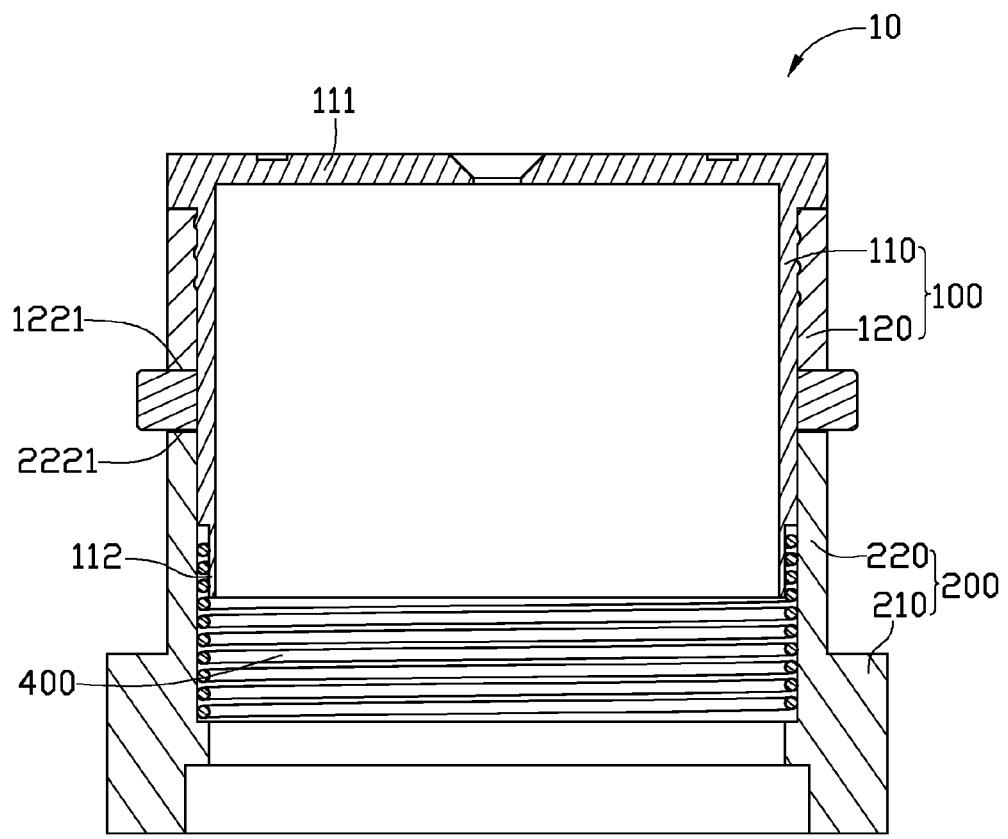
FIG. 3 is a cross-sectional view of the camera module, taken along a line III-III of FIG. 2.
Figure 4:
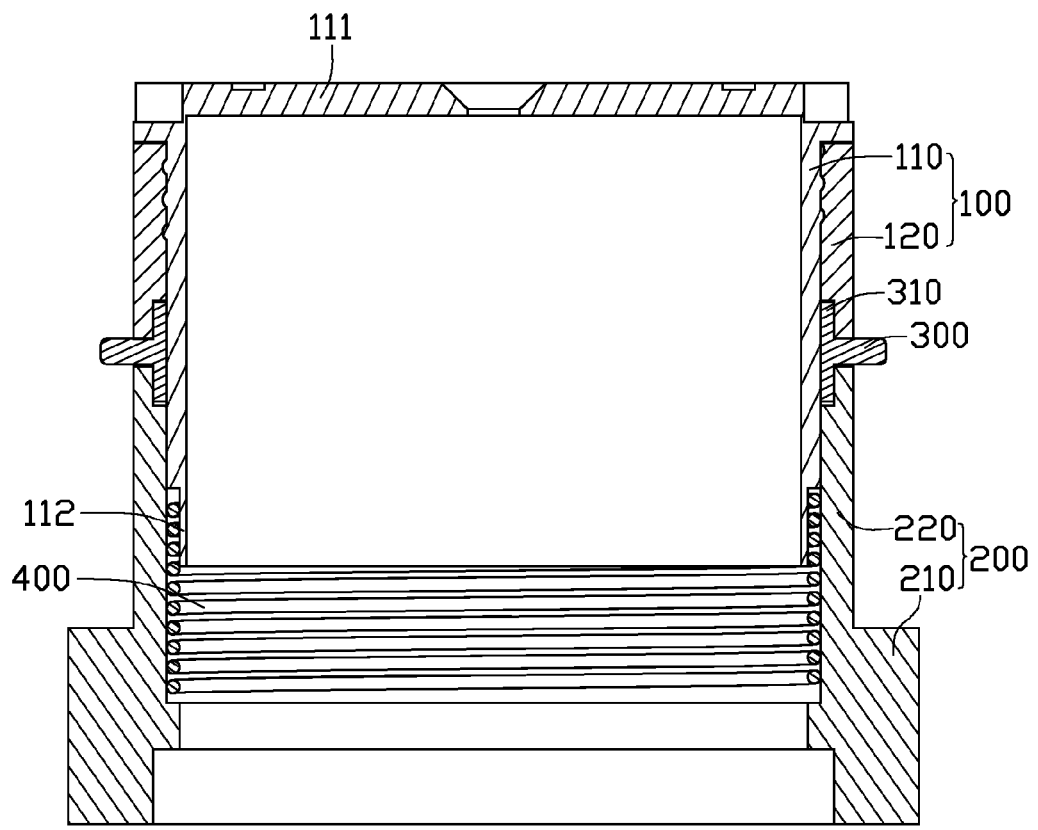
FIG. 4 is a cross-sectional view of the camera module, taken along a line IV-IV of FIG. 2.

Referring to FIGS. 1-4, a camera module 10, according to a first embodiment, includes a barrel assembly 100, a base 200, a focus ring 300, and an elastic element 400.

The barrel assembly 100 includes an inner barrel 110 and an outer barrel 120. The inner barrel 110 is configured for receiving a number of lenses, a spacing ring, a filter, and other required optical elements (not shown). The inner barrel 110 includes a first surface 111 facing the object-side of the camera module 10 and a second surface 112 opposite to the first surface 111. The first surface 111 is disk-shaped and defines a number of grooves 1111 extending along the radial direction thereof for convenience of operation of the inner barrel 110. The outer sidewall of the inner barrel 110 forms a number of first screw threads 113 adjacent to the object side thereof.

The outer barrel 120 receives the inner barrel 110 and includes a bottom surface 121 facing the base 200 and a top surface 122 opposite to the bottom surface 121. The bottom surface 121 defines two sets of curved cutouts: a pair of diametrically defined first curved cutouts 1221 and a pair of diametrically defined second curved cutouts 1222 next to the corresponding first curved cutouts 1221. The depth of the first curved cutout 1221 along the optical axis of the camera module 10 is different from that of the second curved cutout 1222. The inner sidewall of the outer barrel 120 forms a number of second screw threads 123 corresponding to the first screw threads 113. Therefore, the outer barrel 120 can be threaded with the inner barrel 110 through the engagement of the first screw threads 113 with the second screw threads 123. In other alternative embodiments, the outer barrel 120 also can be integrally formed with the inner barrel 110.

The base 200 includes a supporting plate 210 and a barrel-shaped holder 220 perpendicularly extending from the supporting plate 210. The inner diameter of the holder 220 is approximately equal to or slightly larger than the outer diameter of the inner barrel 110. The holder 220 defines a receiving hole 221 along the extending direction of the holder 220 for receiving the inner barrel 110 and the elastic element 400. The holder 220 also includes an end surface 222 facing the object-side of the camera module 10. The end surface 222 defines a pair of third curved cutouts 2221 corresponding to the first curved cutouts 1221 and a pair of fourth curved cutouts 2222 corresponding to the second curved cutouts 1222. The depth of the third curved cutouts 2221 along the optical axis of the camera module 10 is the same as that of the first curved cutouts 1221. The depth of the fourth curved cutouts 2222 along the optical axis of the camera module 10 is the same as that of the second curved cutouts 1222. The first curved cutout 1221 and the third curved cutout 2221 cooperatively define a first through hole 10a. The second curved cutout 1222 and the fourth curved cutout 2222 cooperatively define a second through hole 10b.

The focus ring 300 is annular-shaped and positioned between the bottom surface 121 of the outer barrel 120 and the end surface 222 of the holder 220. In addition, the inner diameters of the focus ring 300 is approximately equal to or slightly smaller than the inner diameters of the outer barrel 120 and the holder 220, the outer diameter of the focus ring 300 is approximately equal to or slightly greater than the outer diameters of the outer barrel 120 and the holder 220. The focus ring 300 includes two opposite surfaces and an inner sidewall connecting the two surfaces. Two baffles 310 diametrically extend along the optical axis of the camera module 10 from the inner sidewall of the focus ring 300. The baffles 310 resist on the inner sidewall of the outer barrel 120 and the inner sidewall of the holder 220 to prevent the focus ring 300 from breaking away from the outer barrel 120 and the holder 220 when the focus ring 300 is moving along the axis of the camera module 10. Two first bumps 321 diametrically protrude from a surface of the focus ring 300 facing the barrel assembly 100. Two second bumps 322 corresponding to the two first bumps 321 diametrically protrude from another surface of the focus ring 300 facing the base 200. Each first bump 321 and the corresponding second bump 322 are semi cylinder-shaped and combined to form a column perpendicular to the optical axis of the camera module 10. In this embodiment, the diameter of the column is approximately equal to or slightly smaller than that of the first through hole 10a. The numbers of the baffle 310 is not limited to this embodiment. In other embodiments, more than two baffles 310 may be employed based on what is needed.

The elastic element 400 is received in the receiving hole 221. One end of the elastic element 400 sleeves the inner barrel 110 and is fixed to the inner barrel 110, the other end of the elastic element 400 is fixed to the base 210. The elastic element 400 pulls the inner barrel 110 towards the image-side of the camera module 10. In this embodiment, the elastic element 400 is a spring.

In assembly, the inner barrel 110 is installed in the outer barrel 120. The first curved cutout 1221 and the third curved cutout 2221 are combined to define the first through hole 10a. The second curved cutout 1222 and the fourth curved cutout 2222 are combined to define the second through hole 10b.

The focus ring 300 is disposed between the bottom surface 121 of the outer barrel 120 and the end surface 222 of the base 220, and the baffles 310 resist on the inner sidewalls of the outer barrel 120 and the receiving hole 221. The bumps 320 are received in the first through holes 10a respectively. One end of the elastic element 400 partially receives the inner barrel 110, and the other end of the elastic element 400 is fixed to the base 210. The elastic element 400 pulls the inner barrel 110 towards the image-side of the camera module 10 to position the focus ring 300 between the barrel assembly 100 and the base 200.

When the focus ring 300 is rotated to make the first bump 321 and the second bump 322 slide from the first through hole 10a and be received in the second through hole 10b, the barrel assembly 100 moves forward (i.e. towards the object-side of the camera module 10) along the optical axis of the camera module 10. When the focus ring 300 is rotated in reverse to make the first bump 321 and the second bump 322 slide from the second through hole 10b and be received in the first through hole 10a, and the elastic element 400 pulls the barrel assembly 100 to move backwards (i.e. towards the image-side of the camera module 10) to the initial position. Therefore, the focus ring 300 which is rotated by the user makes the first bump 321 and the second bump 322 become received in the first through holes 10a and the second through holes 10b in turn, and thus the barrel is driven to move between two different positions (i.e. multiple-step focus).

The outer barrel 120 can also define more than two curved cutouts, and the receiving hole 221 of the base 200 can define more than two corresponding curved cutouts. Thus, the curved cutouts of the outer barrel 120 and the corresponding curved cutouts of the base 200 can be combined to more than two through holes, so as to make the barrel assembly 100 to move among more than two positions along the optical axis of the camera module 10.

Figure 5:
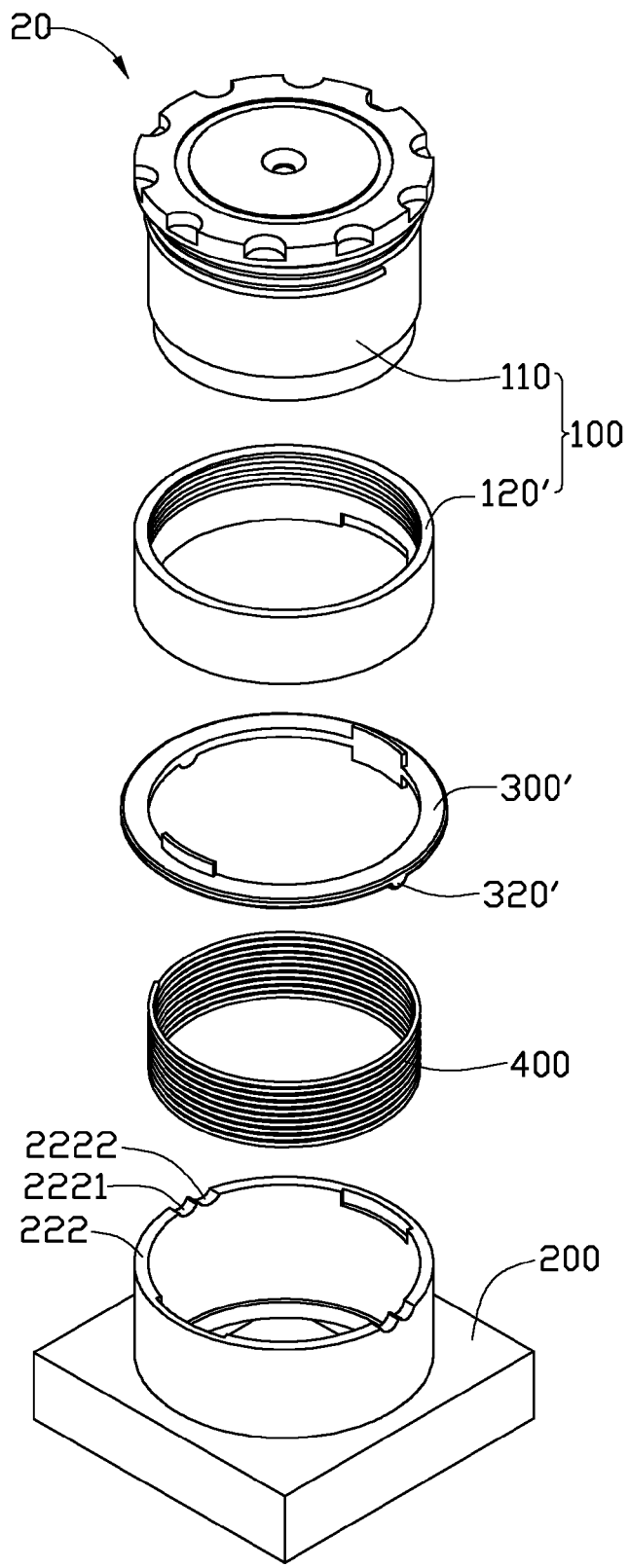
FIG. 5 is an exploded view of a camera module, according to a second embodiment.

Referring to FIG. 5, a camera module 20 according to a second embodiment is slightly different from that of the first embodiment. In this embodiment, a top wall 222 of the base 200 defines a pair of third curved cutouts 2221 and a pair of fourth curved cutouts 2222, the depth of the third curved cutout 2221 along the optical axis of the camera module 20 is different from that of the fourth curved cutout 2222. The outer barrel 120a does not define curved cutouts. The surface of the focus ring 300a facing the base 200 protrudes a pair of bumps 320a, and each of the bumps 320a is semi cylinder-shaped and substantially perpendicular to the optical axis of the camera module 20.

Figure 6:
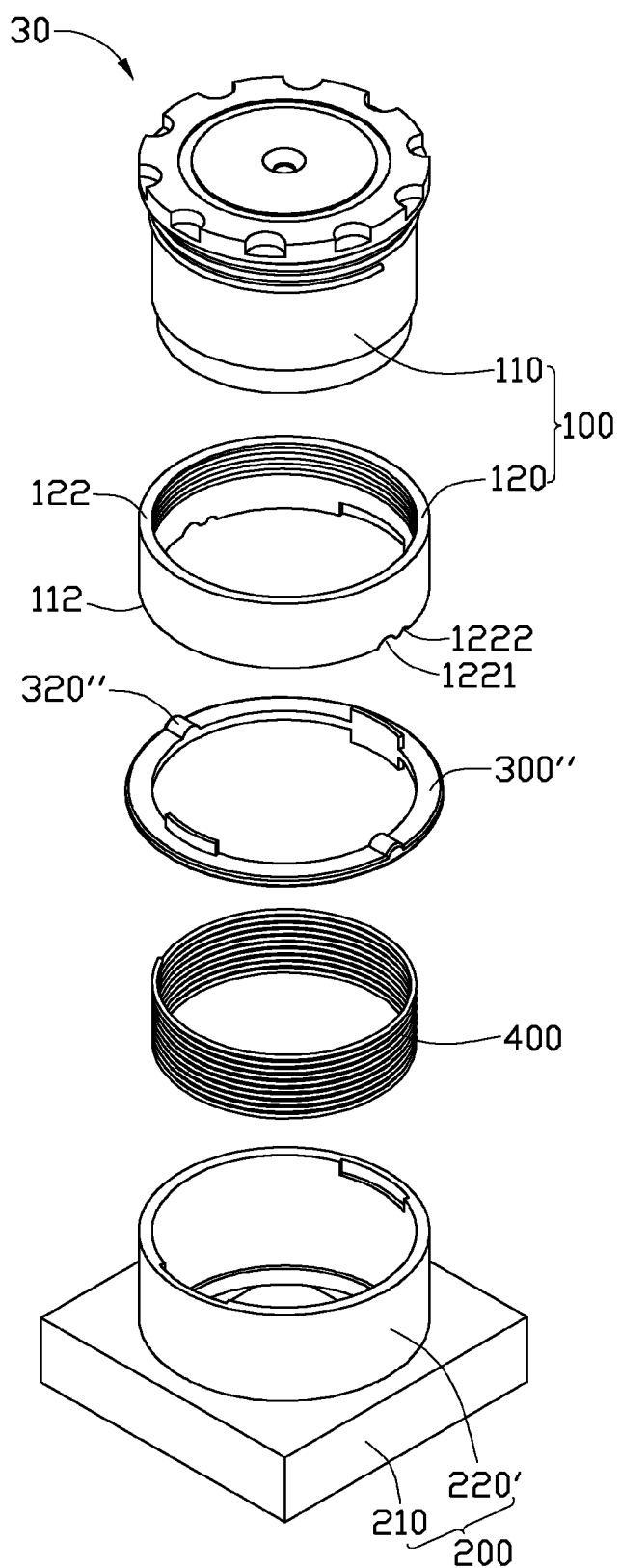
FIG. 6 is an exploded view of a camera module, according to a third embodiment.

Referring to FIG. 6, a camera module 30 according to a third embodiment, is slightly different from that of the first embodiment. In this embodiment, the bottom surface 112 of the barrel 120 defines a pair of first curved cutouts 1221 and a pair of second curved cutouts 1222 along the optical axis of the camera module 30. The depth of the first curved cutout 1221 along the optical axis of the camera module 30 is different from that of the second curved cutout 1222. The holder 220b does not define curved cutouts. A pair of bumps 320b protrudes from the surface of the focus ring 300b facing the outer barrel 120, and each of the bumps 320b is semi cylinder-shaped and substantially perpendicular to the optical axis of the camera module 30.

It will be understood that the above particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A camera module, comprising:
    a barrel comprising a bottom surface, wherein the bottom surface defines a first curved cutout and a second curved cutout, the depth of the first curved cutout along the optical axis of the camera module is different from that of the second curved cutout;
    a base comprising an end surface facing to the bottom surface of the barrel, wherein the end surface of the base defines a third curved cutout and a fourth curved cutout, the first curved cutout and the third curved cutout cooperatively define a first through hole, the second curved cutout and the fourth curved cutout cooperatively define a second through hole;
    a focus ring positioned between the barrel and the base and comprising a bump protruding from the focus ring perpendicular to the optical axis of the camera module, wherein the bump is capable of sliding between the first through hole and the second through hole; and
    an elastic element comprising two opposite ends, wherein one end of the elastic element is fixed to the barrel, the other end of the elastic element is fixed to the base, the elastic element pulls the barrel to position the focus ring between the barrel and the base.

2. The camera module of claim 1, wherein the barrel comprises an inner barrel and an outer barrel receiving the inner barrel.

3. The camera module of claim 2, wherein the inner barrel comprises a first surface towards the object-side of the camera module and a second surface opposite to the first surface, the first surface is disk-shaped and defines a plurality of grooves extending along the radial direction thereof for convenience of operation of the inner barrel.

4. The camera module of claim 2, wherein the inner barrel is threaded with the outer barrel.

5. The camera module of claim 2, wherein the inner barrel and the outer barrel are integrally formed with each other.

6. The camera module of claim 1, wherein the base comprises a supporting plate and a holder perpendicularly extending from the supporting plate, the holder defines a receiving hole receiving the barrel and the elastic element, one end of the elastic element is fixed to the inner sidewall of the receiving hole.

7. The camera module of claim 6, wherein the focus ring is annular-shaped, and a plurality of baffles diametrically extends along the optical axis of the camera module from the inner sidewall of the focus ring, the baffles resist on the inner sidewalls of the barrel and the holder.

8. The camera module of claim 1, wherein the bottom surface defines the first curved cutout and the second curved cutout, the bump protrudes from a surface of the focus ring facing to the barrel.

9. The camera module of claim 1, wherein the end surface of the base defines the first curved cutout and the second curved cutout, the bump protrudes from a surface of the focus ring facing to the base.

10. A camera module, comprising:
    a barrel comprising a bottom surface, the bottom surface defining a first and a second cutouts, wherein the depth of the first cutout along the optical axis of the camera module is different from that of the second cutout;
    a base comprising an end surface facing to the bottom surface of the barrel and defining a receiving hole, wherein the end surface of the base defines a third curved cutout and a fourth curved cutout, the first curved cutout and the third curved cutout cooperatively define a first through hole, the second curved cutout and the fourth curved cutout cooperatively define a second through hole;

a focus ring positioned between the bottom surface and the end surface and comprising a bump protruding from the focus ring and facing the barrel, wherein the bump is capable of sliding between the first cutout through hole and the second cutout through hole; and an elastic element received in the receiving hole and comprising two opposite ends, wherein one end of the elastic element is fixed to the barrel, the other end of the elastic element is fixed to the base.

11. The camera module of claim 10, wherein the focus ring is annular-shaped, and a plurality of baffles diametrically extends along the optical axis of the camera module from the inner sidewall of the focus ring, the baffles contact inner sidewalls of the barrel and the base.

12. A camera module, comprising:

a barrel comprising a bottom surface;

a base comprising an end surface facing to the bottom surface of the barrel and defining a receiving hole, wherein the end surface defines a first and a second cutouts, and the depth of the first cutout along the optical axis of the camera module is different from that of the second cutout, the bottom surface defines a third curved cutout and a fourth curved cutout, the first curved cutout and the third curved cutout cooperatively define a first through hole, the second curved cutout and the fourth curved cutout cooperatively define a second through hole;

a focus ring positioned between the bottom surface and the end surface and comprising a bump protruding from the focus ring and facing the base, wherein the bump is capable of sliding between the first through hole and the second through hole; and an elastic element received in the receiving hole and comprising two opposite ends, wherein one end of the elastic element is fixed to the barrel, and the other end of the elastic element is fixed to the base.

13. The camera module of claim 12, wherein the focus ring is annular-shaped, and a plurality of baffles diametrically extends along the optical axis of the camera module from the inner sidewall of the focus ring, the baffles contact inner sidewalls of the barrel and the base.

* * * * *